(12) United States Patent
Kitagawa et al.

(10) Patent No.: US 12,513,021 B2
(45) Date of Patent: Dec. 30, 2025

(54) IN-VEHICLE DEVICE, IN-VEHICLE NETWORK SYSTEM, AND INFORMATION PROCESSING METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Kazuki Kitagawa, Yokkaichi (JP); Kazuyuki Inoue, Yokkaichi (JP); Tadashi Matsumoto, Yokkaichi (JP); Ryo Yamane, Osaka (JP); Tatsuya Izumi, Osaka (JP); Hideyuki Tanaka, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 42 days.

(21) Appl. No.: 18/554,544

(22) PCT Filed: Mar. 25, 2022

(86) PCT No.: PCT/JP2022/014536
§ 371 (c)(1),
(2) Date: Oct. 9, 2023

(87) PCT Pub. No.: WO2022/230503
PCT Pub. Date: Nov. 3, 2022

(65) Prior Publication Data
US 2024/0187277 A1     Jun. 6, 2024

(30) Foreign Application Priority Data
Apr. 30, 2021 (JP) .................. 2021-077534

(51) Int. Cl.
*H04L 12/40* (2006.01)

(52) U.S. Cl.
CPC .................. *H04L 12/40052* (2013.01); *H04L 2012/40273* (2013.01)

(58) Field of Classification Search
CPC ..... H04L 12/40052; H04L 2012/40273; H04L 27/2655; H04L 27/2656; H04L 27/2662;
(Continued)

(56) References Cited

U.S. PATENT DOCUMENTS

| 2013/0185374 A1 | 7/2013 | Fukasawa et al. |
| 2019/0394739 A1 | 12/2019 | Seo et al. |

(Continued)

FOREIGN PATENT DOCUMENTS

| JP | 2016-005214 A | 1/2016 |
| JP | 2018-112425 A | 7/2018 |

(Continued)

OTHER PUBLICATIONS

International Search Report, Application No. PCT/JP2022/014536, mailed Jun. 28, 2023. ISA/Japan Patent Office.

*Primary Examiner* — Idriss N Alrobaye
*Assistant Examiner* — Richard B Franklin
(74) *Attorney, Agent, or Firm* — Honigman LLP

(57) ABSTRACT

The in-vehicle device for receiving time synchronization information transmitted from each of a plurality of reference devices and transmitting the received time synchronization information to another device, includes: a communication unit configured to communicate with the other device; and an information processing unit configured to, if the communication unit receives a frame in which the time synchronization information is stored, store the time synchronization information in a specific queue with priority over other information, wherein the communication unit transmits the
(Continued)

time synchronization information stored in the specific queue to the other device.

11 Claims, 11 Drawing Sheets

(58) Field of Classification Search
CPC ............ H04L 27/2689; G06F 11/2082; G06F 13/1689; G06F 13/405; G06F 13/42
See application file for complete search history.

(56) References Cited

U.S. PATENT DOCUMENTS

| | | |
|---|---|---|
| 2020/0259579 A1 | 8/2020 | Yamasaki |
| 2021/0289328 A1 | 9/2021 | Yan |

FOREIGN PATENT DOCUMENTS

| | | |
|---|---|---|
| JP | 2018-196038 A | 12/2018 |
| JP | 2020-167616 A | 10/2020 |

IN-VEHICLE DEVICE, IN-VEHICLE NETWORK SYSTEM, AND INFORMATION PROCESSING METHOD

CROSS-REFERENCE TO RELATED APPLICATIONS

This application is the U.S. national stage of PCT/JP2022/014536 filed on Mar. 25, 2022, which claims priority of Japanese Patent Application No. JP 2021-077534 filed on Apr. 30, 2021, the contents of which are incorporated herein.

TECHNICAL FIELD

The present disclosure relates to an in-vehicle device, an in-vehicle network system, and an information processing method.

BACKGROUND

Japanese Patent Laid-Open No. 2020-167616 discloses the following time synchronization system. That is, the time synchronization system is a time synchronization system that causes a grand master clock to perform time synchronization on a slave side, in which a device functioning as a grand master, one or more devices functioning as adjacent relay devices, and one or more devices functioning as terminals are connected to each other via a network. The grand master transmits a signal including a clock on the network, and the terminal corrects the time based on the clock, adds the amount of time correction to a correction integrated value a of the terminal, and if α exceeds a predetermined threshold, transmits a grand master abnormality notification message on the network. The adjacent relay device corrects the time of the adjacent relay device based on the clock, adds the amount of time correction to α of the adjacent relay device, and if α exceeds the predetermined threshold and a grand master abnormality notification message is received from one or more devices under the control of the adjacent relay device, the adjacent relay device transmits a message indicating that the grand master is to once again be determined, on the network.

Conventionally, a technique has been developed in which a time held by a certain device in a network is used as a reference time, and each device in the network uses the reference time to perform time synchronization. In the time synchronization system described in JP 2020-167616A, if an abnormality occurs on the network, it is possible to once again determine the grand master.

However, if the switching of the grand master, that is, the switching of the device that holds the reference time to be used for time synchronization, is performed frequently, there is a possibility that problems will arise, such as the reference time not being stable, and time synchronization between multiple devices not being performed normally.

The present disclosure has been made to solve the above-mentioned problems, and an object thereof is to provide an in-vehicle device, an in-vehicle network system, and an information processing method, according to which it is possible to more stably perform time synchronization in an in-vehicle network.

SUMMARY

An in-vehicle device according to the present disclosure is an in-vehicle device for receiving time synchronization information transmitted from each of a plurality of reference devices and transmitting the received time synchronization information to another device, the in-vehicle device includes: a communication unit configured to communicate with the other device; and an information processing unit configured to, if the communication unit receives a frame in which the time synchronization information is stored, store the time synchronization information in a specific queue with priority over other information, wherein the communication unit transmits the time synchronization information stored in the specific queue to the other device.

An in-vehicle network system according to the present disclosure includes: an in-vehicle device; another device; and a plurality of reference devices for transmitting time synchronization information, wherein if the in-vehicle device receives a frame in which the time synchronization information is stored, the in-vehicle device stores the time synchronization information in a specific queue with priority over other information, and transmits the stored time synchronization information to the other device, and the other device receives the time synchronization information transmitted from the in-vehicle device and performs time synchronization based on the received time synchronization information.

An information processing method according to the present disclosure is an information processing method for an in-vehicle device for receiving time synchronization information transmitted from each of a plurality of reference devices and transmitting the received time synchronization information to another device, the method includes: a step of receiving a frame from the other device; a step of storing the time synchronization information in a specific queue with priority over other information if a frame in which the time synchronization information is stored is received; and a step of transmitting the time synchronization information stored in the specific queue to the other device.

One aspect of the present disclosure can be realized not only as an in-vehicle device that includes such characteristic processing units, but also as a program for enabling a computer to carry out such characteristic processing steps. Also, one aspect of the present disclosure can be realized as a semiconductor integrated circuit that realizes a part or the entirety of the in-vehicle device.

One aspect of the present disclosure can be realized not only as an in-vehicle network system that includes such characteristic processing units, but also as an information processing method for carrying out such characteristic processing as steps, or as a program for enabling a computer to carry out such steps. Also, one aspect of the present disclosure can be realized as a semiconductor integrated circuit that realizes a part or the entirety of the in-vehicle network system.

Effects of the Present Disclosure

According to the present disclosure, time synchronization can be performed more stably in the in-vehicle network.

DETAILED DESCRIPTION OF PREFERRED EMBODIMENTS

Figure 1:
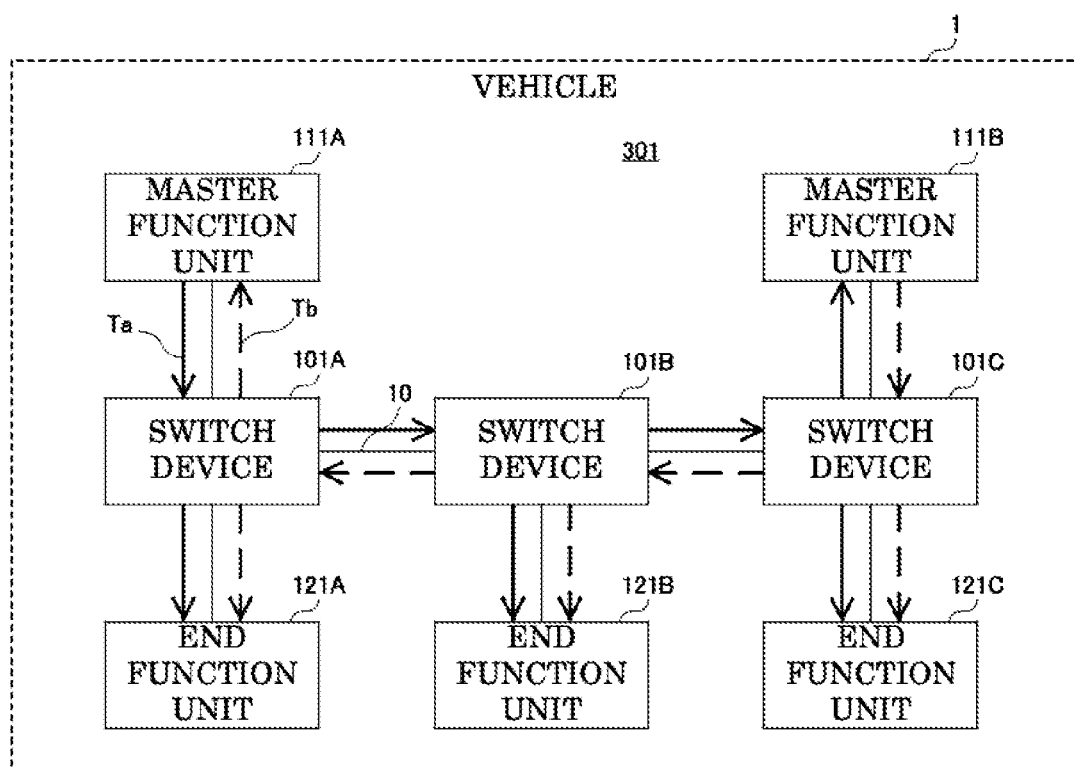
FIG. 1 is a diagram showing a configuration of an in-vehicle network system according to an embodiment of the present disclosure.

First, the details of an embodiment of the present disclosure are listed and described.

An in-vehicle device according to an embodiment of the present disclosure is an in-vehicle device for receiving time synchronization information transmitted from each of a plurality of reference devices and transmitting the received time synchronization information to another device, the in-vehicle device includes: a communication unit configured to communicate with the other device; and an information processing unit configured to, if the communication unit receives a frame in which the time synchronization information is stored, store the time synchronization information in a specific queue with priority over other information, wherein the communication unit transmits the time synchronization information stored in the specific queue to the other device.

With such a configuration, it is possible to prevent time synchronization information from being discarded without being stored in any queue, or to prevent transmission from being significantly delayed, and as a result, it is possible to prevent the occurrence of a situation in which time synchronization information does not reach the other device or is significantly delayed due to temporary communication congestion. If the other device cannot receive the time synchronization information, it is highly likely that the main cause is not communication congestion or the like, but an abnormality or the like on the transmission side of the time synchronization information. For this reason, it can be easily determined that the reference device, which is the transmission source of the time synchronization information to be used for time synchronization, is to be switched. Accordingly, time synchronization can be performed more stably in the in-vehicle network.

A configuration is possible in which the specific queue is a dedicated queue for the time synchronization information conforming to an IEEE standard.

Such a configuration makes it possible to more reliably prevent the occurrence of a situation in which time synchronization information does not reach other in-vehicle devices or is significantly delayed, because information other than time synchronization information is not stored in a specific queue.

A configuration is possible in which the time synchronization information is at least one of a Sync message and a Pdelay_Resp used for time synchronization.

In this manner, with a configuration in which a Sync message and a Pdelay_Resp for which a common Ethertype value is set are stored in the specific queue without being distinguished from each other, it is possible to easily determine whether or not the information stored in the frame is to be stored in a specific queue by, for example, confirming the Ethertype value attached to the received frame.

A configuration is possible in which the in-vehicle device further includes a monitoring unit configured to monitor a reception status of the time synchronization information by the communication unit, and the monitoring unit notifies the other device of the result of monitoring the reception status.

With such a configuration, for example, if the reception status of the time synchronization information is different from that at a normal time, it is possible to even more stably perform time synchronization by switching the reference device that is the transmission source of the time synchronization information to be used for time synchronization. In addition, by sharing the monitoring results with other devices, it is possible for other devices to appropriately determine whether or not to switch the reference device, and therefore it is possible to even more stably perform time synchronization.

A configuration is possible in which the monitoring unit monitors whether or not the time synchronization information has been successfully received, or whether or not identification information attached to the received time synchronization information is correct, as the reception status.

With such a configuration, it is possible to easily and appropriately determine switching of the reference device that is the transmission source of the time synchronization information to be used for time synchronization.

An in-vehicle network system according to an embodiment of the present disclosure includes: an in-vehicle device; another device; and a plurality of reference devices for transmitting time synchronization information, wherein if the in-vehicle device receives a frame in which the time synchronization information is stored, the in-vehicle device stores the time synchronization information in a specific queue with priority over other information, and transmits the stored time synchronization information to the other device, and the other device receives the time synchronization information transmitted from the in-vehicle device and performs time synchronization based on the received time synchronization information.

With such a configuration, it is possible to prevent time synchronization information from being discarded without being stored in any queue, or to prevent transmission from being significantly delayed, and as a result, it is possible to prevent the occurrence of a situation in which time synchronization information does not reach the other device or is significantly delayed due to temporary communication congestion. If the other device cannot receive the time synchronization information, it is highly likely that the main cause is not communication congestion or the like, but an abnormality or the like on the transmission side of the time synchronization information. For this reason, it can be easily determined that the reference device, which is the transmission source of the time synchronization information to be used for time synchronization, is to be switched. Accordingly, time synchronization can be performed more stably in the in-vehicle network.

A configuration is possible in which each of the in-vehicle device and the other device receives the time synchronization information transmitted from each of the reference devices that are different from each other, and selectively uses the received time synchronization information to perform time synchronization, the in-vehicle device monitors a reception status of the time synchronization information and notifies the other device of the result of monitoring the reception status, and based on the result of monitoring notified from the in-vehicle device, the other device switches the reference device that is a transmission source of the time synchronization information to be used for time synchronization, to the other of the reference devices.

With such a configuration, for example, if the reception status of the time synchronization information is different from that at a normal time, it is possible to even more stably perform time synchronization by switching the reference device that is the transmission source of the time synchronization information to be used for time synchronization. In addition, by sharing the monitoring results with other devices, it is possible for other devices to appropriately determine whether or not to switch the reference device, and therefore it is possible to even more stably perform time synchronization.

An information processing method according to an embodiment of the present disclosure is an information processing method for an in-vehicle device for receiving time synchronization information transmitted from each of a plurality of reference devices and transmitting the received time synchronization information to another device, the method includes: a step of receiving a frame from the other device; a step of storing the time synchronization information in a specific queue with priority over other information if a frame in which the time synchronization information is stored is received; and a step of transmitting the time synchronization information stored in the specific queue to the other device.

With such a method, it is possible to prevent time synchronization information from being discarded without being stored in any queue, or to prevent transmission from being significantly delayed, and as a result, it is possible to prevent the occurrence of a situation in which time synchronization information does not reach the other device or is significantly delayed due to temporary communication congestion. If the other device cannot receive the time synchronization information, it is highly likely that the main cause is not communication congestion or the like, but an abnormality or the like on the transmission side of the time synchronization information. For this reason, it can be easily determined that the reference device, which is the transmission source of the time synchronization information to be used for time synchronization, is to be switched. Accordingly, time synchronization can be performed more stably in the in-vehicle network.

Hereinafter, embodiments of the present disclosure will be described with reference to the drawings. Note that, in the drawings, the same reference numerals are given to the same or corresponding components in the drawings, and redundant descriptions thereof are not repeated. Furthermore, at least parts of the embodiments described below may be suitably combined.

Configuration and Basic Operation
Overall Configuration

FIG. 1 is a diagram showing a configuration of an in-vehicle network system according to an embodiment of the present disclosure. With reference to FIG. 1, an in-vehicle network system 301 is mounted in a vehicle 1. Vehicles often employ a redundant configuration to ensure safety and the like. The in-vehicle network system 301 includes, for example, a plurality of switch devices 101, a plurality of master function units (reference devices) 111, and a plurality of end function units 121.

In FIG. 1, as an example, three switch devices 101A, 101B, and 101C, which are the switch devices 101, two master function units 111A and 111B, which are the master function units 111, and three end function units 121A, 121B, and 121C, which are the end function units 121, are shown.

The switch devices 101, the master function units 111, and the end function units 121 are examples of in-vehicle devices, such as ECUs (Electronic Control Units).

The switch devices 101 are connected to a plurality of in-vehicle devices via Ethernet (registered trademark) cables 10, for example, and are capable of communicating with the plurality of in-vehicle devices connected thereto.

More specifically, the switch devices 101 perform relay processing for relaying information from a master function unit 111 or an end function unit 121 to another master function unit 111 or another end function unit 121. For example, the switch devices 101 receive time synchronization information transmitted from each of the plurality of master function units 111 and transmit each received piece of time synchronization information to the other switch device 101 or the end function units 121.

Information is exchanged between the switch devices 101 and the master function units 111 and between the switch devices 101 and the end function units 121 using, for example, an Ethernet frame (hereinafter simply referred to as a "frame") in which IP packet is stored.

The master function units 111 and the end function units 121 are external communication ECUs, sensors, cameras, navigation devices, automatic driving processing ECUs, engine control devices, AT (Automatic Transmission) control devices, HEV (Hybrid Electric Vehicle) control devices, brake control devices, chassis control devices, steering control devices, instrument display control devices, and the like.

Each of the master function units 111A and 111B holds a reference time in the in-vehicle network system 301. Each of the master function units 111A and 111B periodically or irregularly transmits time synchronization information to other in-vehicle devices. Here, the master function units 111A and 111B transmit time synchronization information at a transmission cycle of 125 milliseconds.

Each in-vehicle device in the in-vehicle network system 301 receives both time synchronization information Ta from the master function unit 111A and time synchronization information Tb from the master function unit 111B.

More specifically, the switch device 101A receives the time synchronization information Ta directly from the master function unit 111A, and receives the time synchronization information Tb via the switch devices 101C and 101B. The switch device 101B receives the time synchronization information Ta via the switch device 101A, and receives the time synchronization information Tb via the switch device 101C. The switch device 101C receives the time synchronization information Ta via the switch devices 101A and 101B, and receives the time synchronization information Tb directly from the master function unit 111B.

The end function unit 121A receives the time synchronization information Ta via the switch device 101A, and receives the time synchronization information Tb via the switch devices 101C, 101B, and 101A. The end function unit 121B receives the time synchronization information Ta via the switch devices 101A and 101B, and receives the time synchronization information Tb via the switch devices 101C and 101B. The end function unit 121C receives the time synchronization information Ta via the switch devices 101A, 101B, and 101C, and receives the time synchronization information Tb via the switch device 101C.

The master function unit 111A receives the time synchronization information Tb via the switch devices 101C, 101B, and 101A. The master function unit 111B receives the time synchronization information Ta via the switch devices 101A, 101B, and 101C.

Each in-vehicle device performs time synchronization by selectively using the time synchronization information Ta and the time synchronization information Tb. For example, in the initial state, each in-vehicle device performs time synchronization with the master function unit 111A based on the time synchronization information Ta.

Also, for example, if a predetermined condition to be described later is satisfied, each in-vehicle device performs switching processing for switching the master function unit 111 (hereinafter referred to as "GM (Grand Master)") that is the transmission source of the time synchronization information to be used for time synchronization, from the master function unit 111A to the master function unit 111B. That is, if a predetermined condition is satisfied, each in-vehicle device switches the GM from the master function unit 111A to the master function unit 111B and performs time synchronization with the master function unit 111B based on the time synchronization information Tb from the master function unit 111B.

Also, each in-vehicle device performs switch processing for switching the GM from the master function unit 111B to the master function unit 111A when a later-described predetermined condition is satisfied while the GM is the master function unit 111B. Then, each in-vehicle device performs time synchronization with the master function unit 111A based on the time synchronization information Ta from the master function unit 111A.

Figure 2:
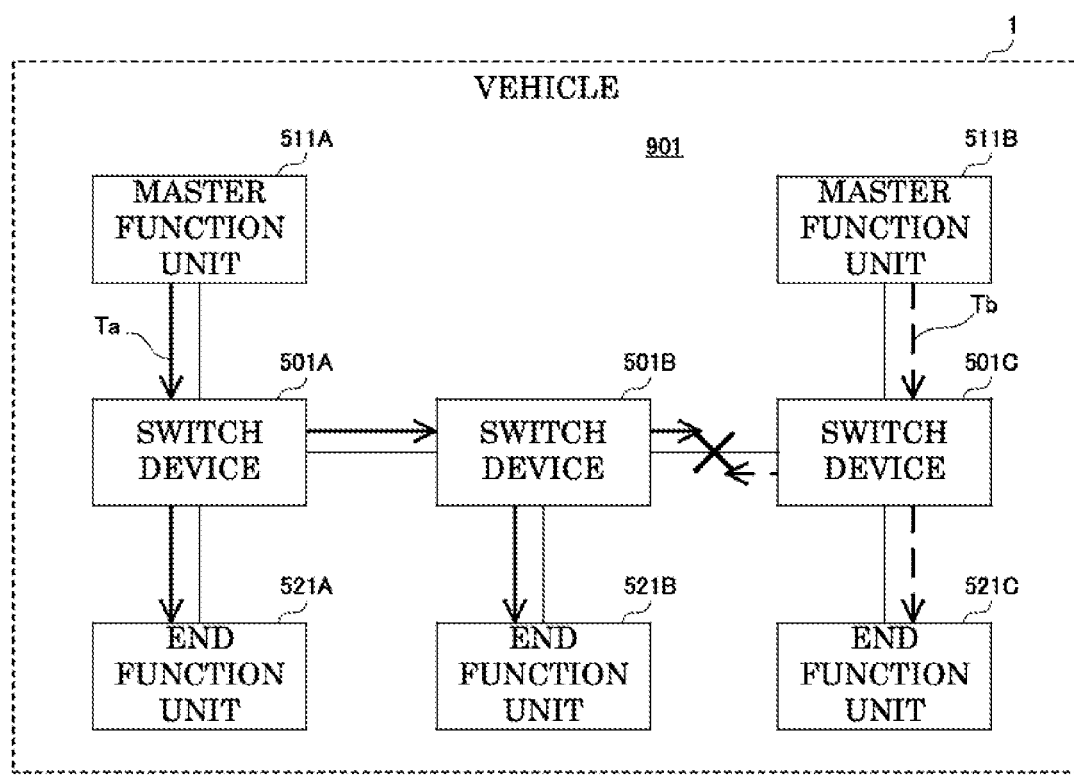
FIG. 2 is a diagram showing a comparative example of the in-vehicle network system according to the embodiment of the present disclosure.

FIG. 2 is a diagram showing a comparative example of the in-vehicle network system according to the embodiment of the present disclosure. With reference to FIG. 2, an in-vehicle network system 901 according to a comparative example includes three switch devices 501A, 501B, and 501C, two master function units 511A and 511B, and three end function units 521A, 521B, and 521C. The switch devices 501, the master function units 511, and the end function units 521 are examples of in-vehicle devices, and are, for example, ECUs.

Each of the master function units 511A and 511B holds a reference time in the in-vehicle network system 901, similarly to the master function units 111A and 111B shown in FIG. 1. Each of the master function units 511A and 511*b* transmits the time synchronization information to other in-vehicle devices at a transmission cycle of 125 milliseconds, for example.

Each in-vehicle device in the in-vehicle network system 901 receives both time synchronization information Ta from the master function unit 511A and time synchronization information Tb from the master function unit 511B, and for example, in the initial state, performs time synchronization with the master function unit 511A based on the time synchronization information Ta.

Also, each in-vehicle device in the in-vehicle network system 901 is set to perform GM switching processing if, for example, the time synchronization information from the GM cannot be received in the transmission cycle of the time synchronization information. For example, if the time synchronization information Ta does not reach each vehicle-mounted device due to an abnormality occurring on the master function unit 511A side, which is the GM, each in-vehicle device switches the GM from the master function unit 511A to the master function unit 511B and performs time synchronization.

However, in some cases, each in-vehicle device cannot receive the time synchronization information at the transmission cycle of the time synchronization information due to a temporary factor such as communication congestion. For example, it is assumed that communication is congested between the switch device 501B and the switch device 501C. In this case, the switch device 501C, the master function unit 511B, and the end function unit 521C cannot receive the time synchronization information Ta at a transmission cycle of 125 milliseconds. For this reason, the switch device 501C, the master function unit 511B, and the end function unit 521C perform switching processing for switching the GM from the master function unit 511A to the master function unit 511B.

Also, for example, it is assumed that after the switch device 501C, the master function unit 511B, and the end function unit 521C perform switching processing for switching the GM to the master function unit 511B, communication congestion between the switch device 501B and the switch device 501C is resolved. In this case, the switch device 501C, the master function unit 511B, and the end function unit 521C can once again receive the time synchronization information Ta at the transmission cycle of 125 milliseconds, and therefore perform switch processing for returning the GM from the master function unit 511B to the master function unit 511A.

In this manner, on the receiving side of the time synchronization information, it is not possible to determine whether the main cause of the inability to receive the time synchronization information is an abnormality on the GM side or temporary communication congestion, and therefore it is conceivable that GM switching processing is frequently performed due to changes in the environment. In such a case, the reference time is not stable, and there is a possibility that problems such as time synchronization not being performed normally between the in-vehicle devices may occur. On the other hand, each in-vehicle device in the in-vehicle network system 301 according to the embodiment of the present disclosure performs time synchronization more stably with the following configuration.

Switch Device and Master Function Unit

Configuration of Switch Device

Figure 3:
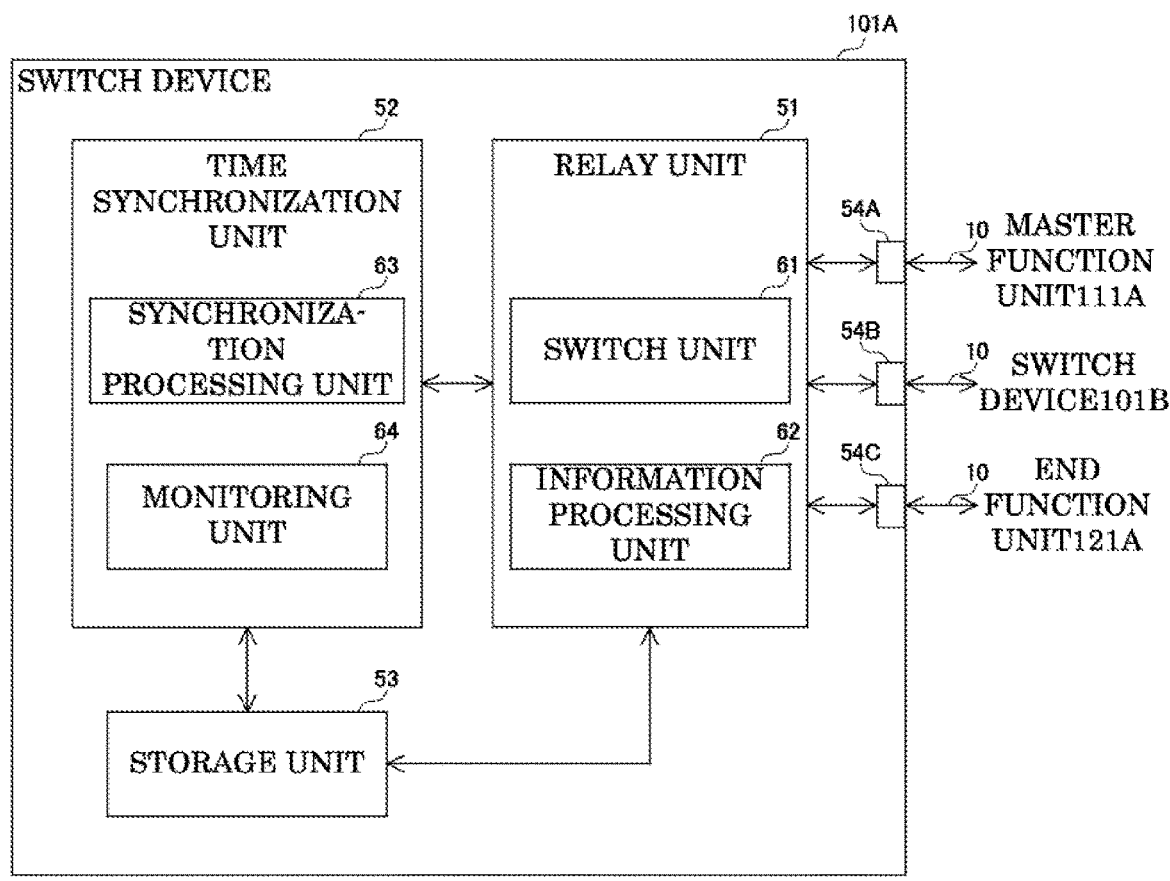
FIG. 3 is a diagram showing a configuration of a switch device according to an embodiment of the present disclosure.

FIG. 3 is a diagram showing a configuration of a switch device according to an embodiment of the present disclosure. Here, the configuration of the switch device 101A will be described. The configurations of the switch devices 101B and 101C are similar to the configuration of the switch device 101A.

With reference to FIG. 3, the switch device 101A includes a relay unit 51, a time synchronization unit 52, a storage unit 53, and a plurality of communication ports 54. The relay unit 51 and the time synchronization unit 52 are realized by processors such as CPUs (Central Processing Units) and DSPs (Digital Signal Processors), for example. The storage unit 53 is, for example, a non-volatile memory. The relay unit 51 includes a switch unit 61 and an information processing unit 62. The time synchronization unit 52 includes a synchronization processing unit 63 and a monitoring unit 64.

Relay Processing Performed by Switch Device

Communication ports 54 are terminals to which the Ethernet cables can be connected, for example. Note that the communication ports 54 may also be terminals of integrated circuits. Each of the plurality of communication ports 54 is connected to any one of the plurality of in-vehicle devices in the in-vehicle network system 301 via an Ethernet cable 10. In this example, the communication port 54A is connected to the master function unit 111A, the communication port 54B is connected to the switch device 101B, and the communication port 54C is connected to the end function unit 121A.

The storage unit 53 stores an address table showing the correspondence relationship between the port number of the communication port 54 and the MAC (Media Access Control) address of the connection destination device.

The relay unit 51 relays data between other in-vehicle devices by communicating with the other in-vehicle devices. That is, upon receiving an Ethernet frame transmitted from a master function unit 111 or an end function unit 121 via the corresponding communication port 54, the relay unit 51 performs relay processing on the received Ethernet frame.

More specifically, the switch unit 61 in the relay unit 51 refers to an address table stored in the storage unit 53 and specifies a port number corresponding to a transmission destination MAC address included in the received Ethernet frame. The switch unit 61 then transmits the received Ethernet frame from the communication port 54 with the specified port number.

Configuration of Master Function Unit

Figure 4:
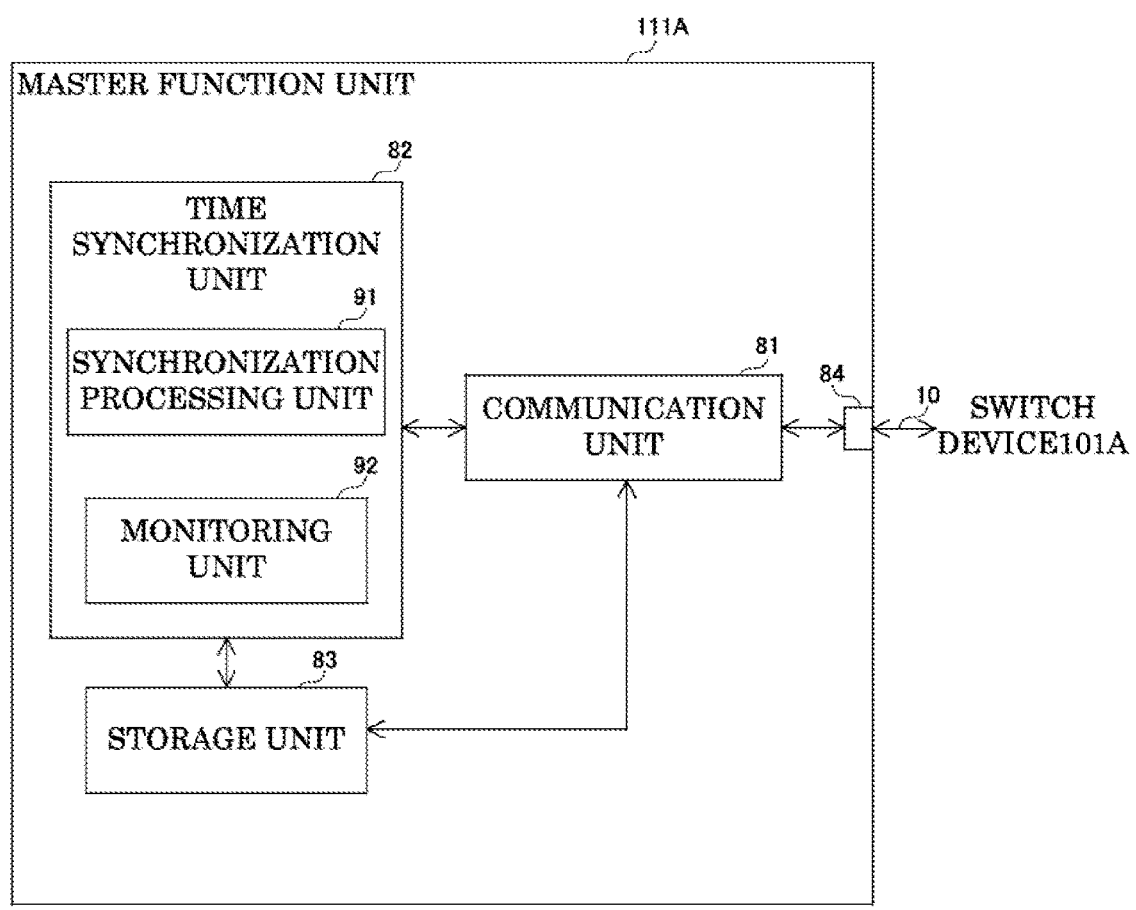
FIG. 4 is a diagram showing a configuration of a master function unit according to the embodiment of the present disclosure.

FIG. 4 is a diagram showing a configuration of a master function unit according to the embodiment of the present disclosure. Here, the configuration of the master function unit 111A will be described. The configuration of the master function unit 111B is similar to that of the master function unit 111A.

With reference to FIG. 4, the master function unit 111 A includes a communication unit 81, a time synchronization unit 82, a storage unit 83, and a communication port 84. The communication unit 81 and the time synchronization unit 82 are realized by processors such as a CPU and a DSP, for example. The storage unit 83 is, for example, a non-volatile memory.

The time synchronization unit 82 includes a synchronization processing unit 91 and a monitoring unit 92. The communication port 84 is a terminal to which an Ethernet cable 10 can be connected, for example. Note that the communication port 84 may be a terminal of an integrated circuit or the like. The communication port 84 is connected via the Ethernet cable 10 to the switch device 101A.

Figure 5:
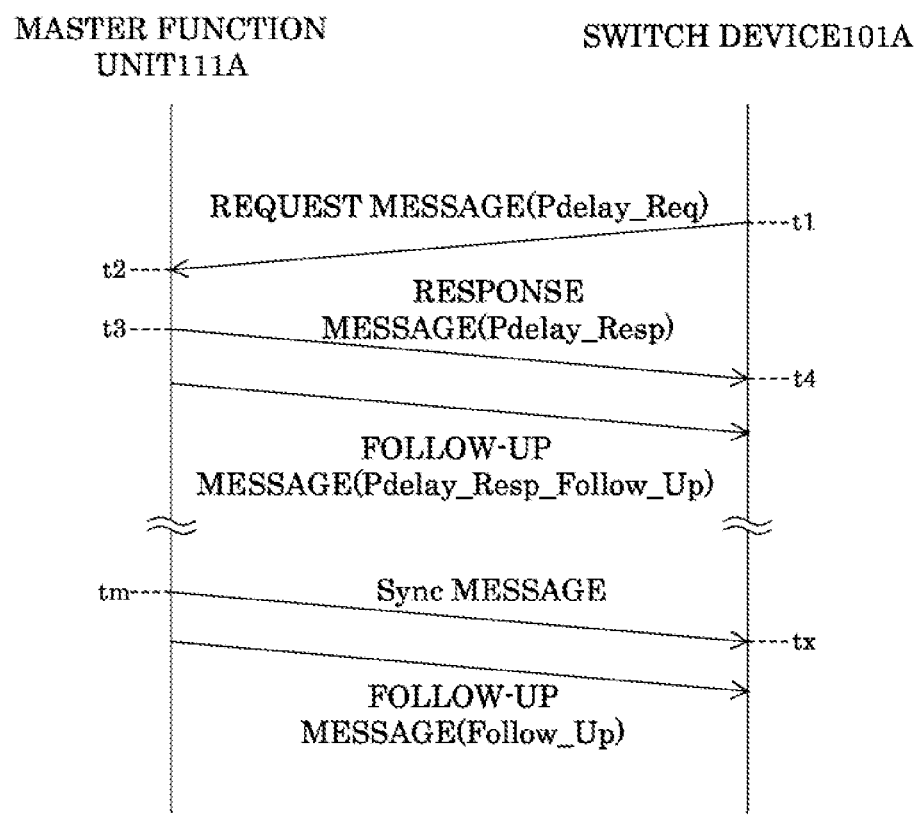
FIG. 5 is a diagram for illustrating a method for updating a propagation delay time, performed by the switch device according to the embodiment of the present disclosure.

Update of Propagation Delay Time of Data Between Master Function Unit and Switch Device FIG. 5 is a diagram for illustrating a method for updating a propagation delay time, performed by the switch device according to the embodiment of the present disclosure.

With reference to FIGS. 3 to 5, the synchronization processing unit 63 in the switch device 101A periodically or irregularly updates a propagation delay time Td1 of data between the master function unit 111A and the switch device 101A. More specifically, the synchronization processing unit 63 transmits request information (Pdelay_Req) for requesting time information used to update the propagation delay time Td1 to the master function unit 111A via the relay unit 51 and the communication port 54A. Hereinafter, the request information is also referred to as a "request message".

The communication unit 81 in the master function unit 111A receives the request message transmitted from the switch device 101A via the communication port 84, and outputs the received request message to the time synchronization unit 82.

The synchronization processing unit 91 in the time synchronization unit 82 receives the request message from the communication unit 81 and outputs time information (Pdelay_Resp), which is an example of time synchronization information Ta, to the communication unit 81 in response to the request message. The communication unit 81 transmits the time information received from the synchronization processing unit 91 to the switch device 101A via the communication port 84. At this time, the synchronization processing unit 91 transmits the time information including a reception time t2 of the request message. Hereinafter, the time information is also referred to as a "response message".

After transmitting the response message, the synchronization processing unit 91 also outputs a follow-up message (Pdelay_Resp_Follow_Up) including a transmission time t3 of the response message to the communication unit 81. The communication unit 81 transmits the follow-up message received from the synchronization processing unit 91 to the switch device 101A via the communication port 84.

The information processing unit 62 in the switch device 101A receives the response message and follow-up message transmitted from the master function unit 111A via the communication port 54A. Then, the information processing unit 62 notifies the time synchronization unit 52 of the time t2 included in the response message and the time t3 included in the follow-up message.

The information processing unit 62 also notifies the time synchronization unit 52 of the transmission time t1 of the request message and the reception time t4 of the response message. More specifically, the switch device 101A includes a counter (not shown). The information processing unit 62 notifies the time synchronization unit 52 of the count value of the counter at the transmission timing of the request message as the transmission time t1. Also, the information processing unit 62 notifies the time synchronization unit 52 of the count value of the counter at the reception timing of the response message as the reception time t4.

The synchronization processing unit 63 in the time synchronization unit 52 calculates the data propagation delay time Td1 between the master function unit 111A and the switch device 101 based on the times t1, t2, t3, and t4 notified from the information processing unit 62. Specifically, the synchronization processing unit 63 calculates a propagation delay time $Td1=((t4-t1)-(t3-t2))/2$. Then, the synchronization processing unit 63 updates the propagation delay time Td1 stored in the storage unit 53 to the newly calculated propagation delay time Td1.

Correction of Time in Switch Device

The synchronization processing unit 91 in the master function unit 111A periodically or irregularly outputs a Sync message, which is an example of the time synchronization information Ta, to the communication unit 81. The communication unit 81 transmits the Sync message received from the synchronization processing unit 91 via the communication port 84 to the switch device 101A. Here, it is assumed that the master function unit 111A transmits a Sync message at a transmission cycle of 125 milliseconds.

Also, after transmitting a Sync message, the synchronization processing unit 91 in the master function unit 111A outputs a follow-up message (Follow_Up) including a transmission time tm of the Sync message to the communication unit 81. The communication unit 81 transmits the follow-up message received from the synchronization processing unit 91 to the switch device 101A via the communication port 84.

The synchronization processing unit 91 in the master function unit 111B periodically or irregularly outputs a Sync message, which is an example of the time synchronization information Tb, to the communication unit 81. The communication unit 81 transmits the Sync message received from the synchronization processing unit 91 to the switch device 101A via the communication port 84 and the switch devices 101C and 101B. Here, it is assumed that the master function unit 111B transmits a Sync message at a transmission cycle of 125 milliseconds.

Also, after outputting a Sync message, the synchronization processing unit 91 of the master function unit 111B outputs a follow-up message (Follow_Up) including the transmission time tm of the Sync message to the communication unit 81. The communication unit 81 transmits the follow-up message received from the synchronization processing unit 91 to the switch device 101A via the communication port 84 and the switch devices 101C and 101B.

The information processing unit 62 of the switch device 101A receives, via the communication port 54, a frame in which the Sync messages received from the master function units 111A and 111B are stored and a frame in which the follow-up messages are stored. Then, the information processing unit 62 saves the Sync messages stored in the received frames in the storage unit 53, for example.

Also, the information processing unit 62 refers to the domain ID included in the message header portion of the received frame to confirm the transmission source of the frame. If the information processing unit 62 confirms that it has received a frame in which a follow-up message from the master function unit 111A, which is the GM, is stored, the information processing unit 62 notifies the time synchronization unit 52 of the time tm included in the follow-up message.

Also, if the information processing unit 62 confirms that it has received a frame in which a Sync message from the master function unit 111A, which is the GM, is stored, the information processing unit 62 notifies the time synchronization unit 52 of the count value of the counter at the reception timing of the frame as a reception time tx of the Sync message.

The synchronization processing unit 63 of the time synchronization unit 52 performs time synchronization with the master function unit 111A based on the times tm and tx notified from the information processing unit 62 and the propagation delay time Td1 stored in the storage unit 53. More specifically, the synchronization processing unit 63 calculates a time difference Tx1=tm−Td1−tx, which is the difference between the time of the master function unit 111A and the time of the switch device 101, based on the times tm and tx and the propagation delay time Td1.

Then, the synchronization processing unit 63 uses the calculated time difference Tx1 to correct the time in the switch device 101A. This establishes time synchronization between the master function unit 111A, which is the GM, and the switch devices 101.

Storing Sync Messages in Dedicated Queue

If the information processing unit 62 in the relay unit 51 has received a Sync message from the master function unit 111A or the master function unit 111B as described above, the information processing unit 62 stores the Sync message in the storage unit 53.

More specifically, upon receiving a frame via the communication port 54, for example, the information processing unit 62 refers to the Ethertype value included in the header portion of the frame. Then, if the information processing unit 62 confirms that the Ethertype value is a value corresponding to a Sync message conforming to the IEEE standard, the information processing unit 62 stores the Sync message, with priority over other information, in a specific queue among the queues of the storage unit 53.

Figure 6:
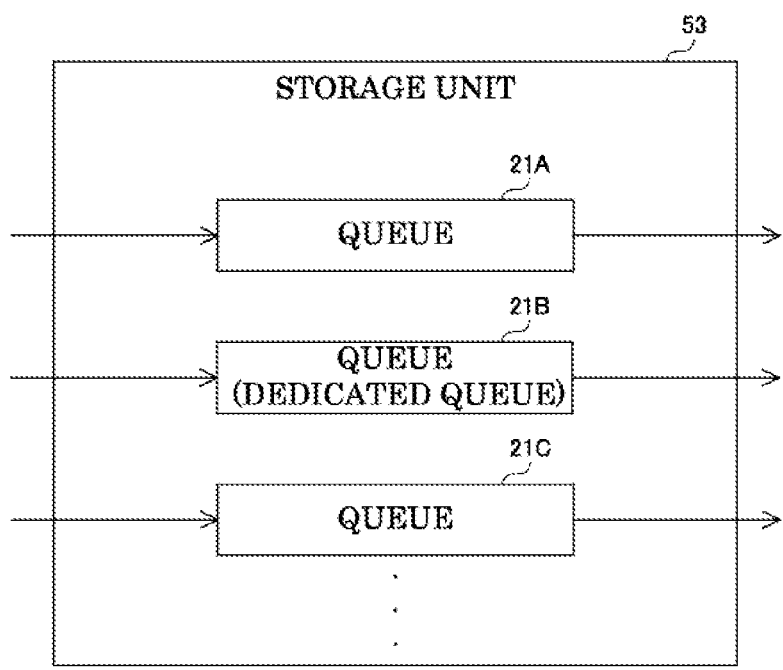
FIG. 6 is a diagram for illustrating storage of a Sync message in a storage unit in the switch device according to the embodiment of the present disclosure.

FIG. 6 is a diagram for illustrating storage of a Sync message in a storage unit in the switch device according to the embodiment of the present disclosure. With reference to FIG. 6, in the storage unit 53, storage regions for a plurality of queues 21A, 21B, 21C, . . . , which are queues 21, are ensured. The queue 21B is a dedicated queue (hereinafter also simply referred to as a "dedicated queue") for storing time synchronization information. The dedicated queue 21B stores, for example, a Sync message, which is time synchronization information, and time information (Pdelay_Resp).

Here, in a standard that can be applied to time synchronization in vehicles, such as IEEE 802.1AS-2020, time synchronization information such as a Sync message and time information (Pdelay_Resp) is usually stored in one of a plurality of the queues 21 without being distinguished from other information. For this reason, for example, if the queues 21 are full of other information or a large amount of information is stored, there is a possibility that the time synchronization information will be discarded without being saved in any queue 21, or the transmission will be significantly delayed.

On the other hand, the information processing unit 62 in the switch device 101A according to the embodiment of the present disclosure confirms the Ethertype value of the frame, and stores the time synchronization information stored in the frame in the dedicated queue 21B. This makes it possible to prevent the Sync message from being discarded without being stored in any queue 21, or prevent the transmission of the Sync message from being significantly delayed, and it is possible to prevent the occurrence of a situation in which the Sync message does not reach the other in-vehicle device or is significantly delayed due to temporary communication congestion.

End Function Unit

Figure 7:
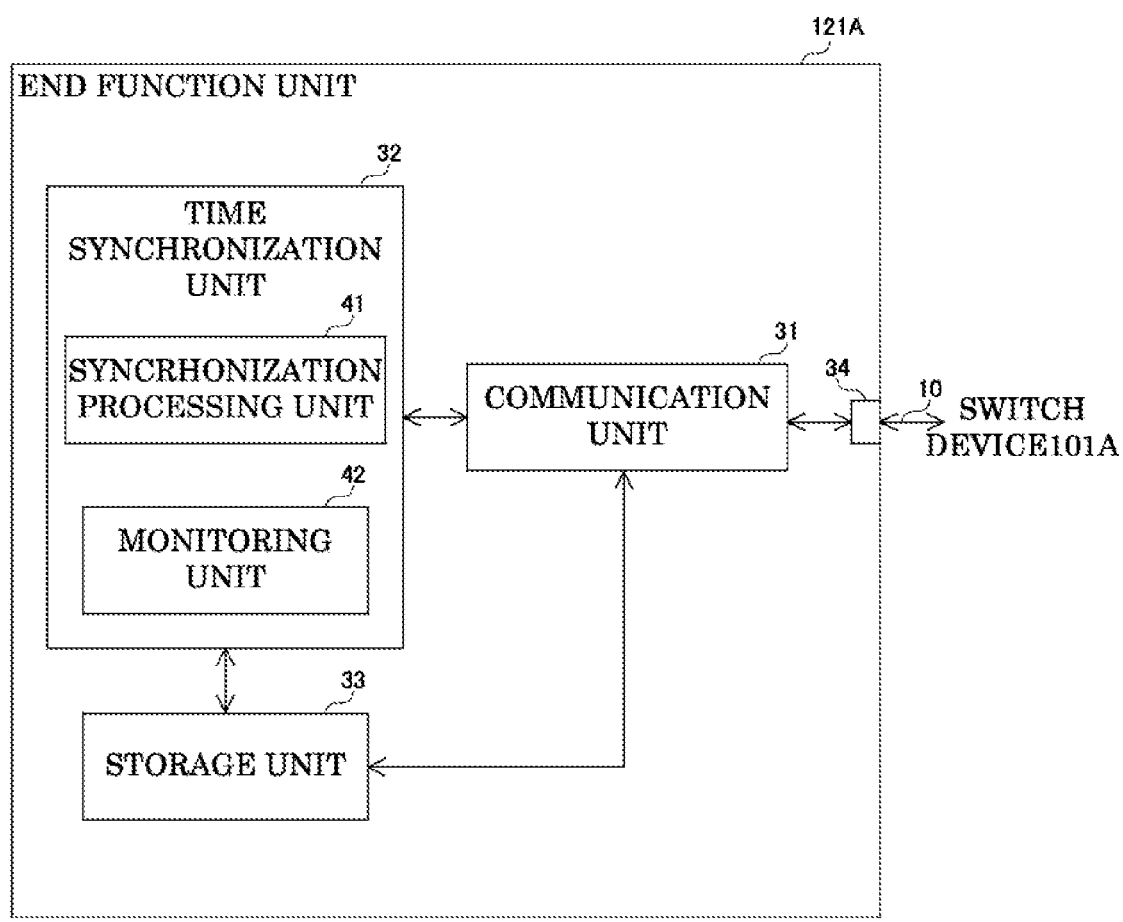
FIG. 7 is a diagram showing a configuration of an end function unit according to the embodiment of the present disclosure.

FIG. 7 is a diagram showing a configuration of an end function unit according to the embodiment of the present disclosure. Here, the configuration of the end function unit 121A will be described. The configurations of the end function units 121B and 121C are similar to the configuration of end function unit 121A.

With reference to FIG. 7, the end function unit 121A includes a communication unit 31, a time synchronization unit 32, a storage unit 33, and a communication port 34. The communication unit 31 and the time synchronization unit 32 are realized by processors such as a CPU and a DSP, for example. The storage unit 33 is, for example, a non-volatile memory.

The time synchronization unit 32 includes a synchronization processing unit 41 and a monitoring unit 42. The communication port 34 is, for example, a terminal to which an Ethernet cable 10 can be connected. Note that the communication port 34 may also be a terminal of an integrated circuit or the like. The communication port 34 is connected via the Ethernet cable 10 to the switch device 101A.

Update of Propagation Delay Time of Data Between Switch Device and End Function Unit The end function unit 121A updates the propagation delay time Td2 of data between the switch device 101A and the end function unit 121A.

Figure 8:
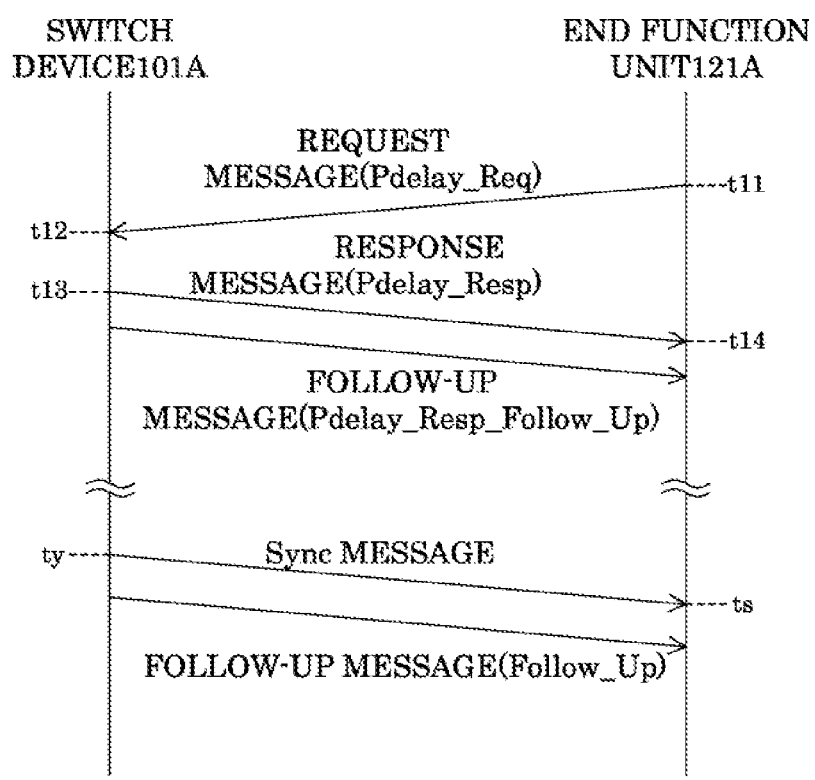
FIG. 8 is a diagram for illustrating a propagation delay time updating method performed by the end function unit according to the embodiment of the present disclosure.

FIG. 8 is a diagram for illustrating a propagation delay time updating method performed by the end function unit according to the embodiment of the present disclosure.

Specifically, with reference to FIGS. 7 and 8, the synchronization processing unit 41 in the end function unit 121A periodically or irregularly updates the propagation delay time Td2 of data between the switch device 101A and the end function unit 121A, similarly to the synchronization processing unit 63 in the switch device 101A shown in FIG. 3. More specifically, the synchronization processing unit 41 transmits a request message for requesting time information used for updating the propagation delay time Td2 to the switch device 101A via the communication unit 31 and the communication port 34.

The information processing unit 62 in the switch device 101A outputs the request message to the synchronization processing unit 63 upon receiving the request message transmitted from the end function unit 121A via the communication port 54C.

Upon receiving the request message from the information processing unit 62, the synchronization processing unit 63 transmits a response message to the request message to the end function unit 121A via the relay unit 51 and the communication port 54C. At this time, the synchronization processing unit 63 transmits the response message including the reception time t12 of the request message.

Also, after transmitting the response message, the synchronization processing unit 63 transmits a follow-up message including a transmission time t13 of the response message to the end function unit 121A via the relay unit 51 and the communication port 54C.

The communication unit 31 in the end function unit 121A receives, via the communication port 84, the response message and the follow-up message transmitted from the switch device 101A. Then, the communication unit 31 notifies the time synchronization unit 32 of the time t12 included in the response message and the time t13 included in the follow-up message.

Also, the communication unit 31 notifies the time synchronization unit 32 of the transmission time t11 of the request message and the reception time t14 of the response message. More specifically, the end function unit 121A includes a counter (not shown). The communication unit 31 notifies the time synchronization unit 32 of the count value of the counter at the transmission timing of the request message as the transmission time t11. Also, the communication unit 31 notifies the time synchronization unit 32 of the count value of the counter at the reception timing of the response message as the reception time t14.

The synchronization processing unit 41 in the time synchronization unit 32 calculates the data propagation delay time Td2 between the switch device 101A and the end function unit 121A based on the times t11, t12, t13, and t14 notified from the communication unit 31. Specifically, the synchronization processing unit 41 calculates the propagation delay time Td2=((t14−t11)−(t13−t12))/2. Then, the synchronization processing unit 41 updates the propagation delay time Td2 stored in the storage unit 83 to the newly-calculated propagation delay time Td2.

Correction of Time in End Function Unit

The synchronization processing unit 63 in the switch device 101A transmits the Sync message from the master function unit 111A stored in the dedicated queue 21B of the storage unit 53 to the end function unit 121A, with a higher priority than information stored in other queues 21, for example. Also, after transmitting the Sync message, the synchronization processing unit 63 transmits a follow-up message including a transmission time ty of the Sync message to the end function unit 121A.

Also, the synchronization processing unit 63 of the switch device 101A transmits the Sync message from the master function unit 111B stored in the dedicated queue 21B of the storage unit 53 to the end function unit 121A, with a higher priority than information stored in the other queues 21, for example. Also, after transmitting the Sync message, the synchronization processing unit 63 transmits a follow-up message including the transmission time ty of the Sync message to the end function unit 121A.

The end function unit 121A performs time synchronization based on the Sync message and the follow-up message transmitted from the switch device 101A. More specifically, the communication unit 31 in the end function unit 121A receives, via the communication port 34, the frame in which the Sync message transmitted from the switch device 101A is stored and the frame in which the follow-up message is stored. Then, the communication unit 31, for example, refers to the domain ID included in the message header portion of the frame in which the received Sync message is stored, and confirms the transmission source of the frame.

If the communication unit 31 confirms that the frame in which the Sync message from the master function unit 111A, which is the GM, is stored has been received, for example, the communication unit 31 notifies the time synchronization unit 32 of the time ty included in the follow-up message received immediately after the frame. Also, the communication unit 31 notifies the time synchronization unit 32 of the count value of the counter at the reception timing of the Sync message stored in the frame as a reception time ts of the Sync message.

The synchronization processing unit 41 in the time synchronization unit 32 performs time synchronization with the switch device 101A based on the times ty and ts notified from the communication unit 31 and the propagation delay time Td2 stored in the storage unit 33. More specifically, the synchronization processing unit 41 calculates a time difference Tx2=ty−Td2−ts, which is the difference between the time of the switch device 101A and the time of the end function unit 121A. Then, the synchronization processing unit 41 uses the calculated time difference Tx2 to correct the time in the end function unit 121A of the synchronization processing unit 41.

Here, if time synchronization is established between the master function unit 111A and the switch device 101A, the time ty included in the follow-up message transmitted from the switch device 101A to the end function unit 121A is a time that is synchronized with the master function unit 111A. For this reason, the synchronization processing unit 41 of the end function unit 121A performs time correction, thereby establishing time synchronization between the end function unit 121A and the switch devices 101, and as a result, time synchronization between the end function unit 121A and the master function unit 111A is established.

The switch devices 101B and 101C, the end function unit 121B and 121C, and the master function unit 111B establish time synchronization with the master function unit 111A, which is the GM, similarly to the switch device 101A and end function unit 121A.

GM Switching Processing

The master function units 111, the switch devices 101, and the end function units 121 monitor their own respective reception statuses of time synchronization information, and notify the other in-vehicle devices of the monitoring results. Each in-vehicle device performs GM switching processing based on the monitoring results notified from the other in-vehicle devices.

Switching Processing Based on Result of Monitoring Whether or not Sync Message was Successfully Received With reference to FIG. 3 again, the monitoring unit 64 of the switch device 101A monitors the reception status of the time synchronization information in the relay unit 51, and notifies the other in-vehicle devices of the monitoring result of the reception status.

Specifically, the monitoring unit 64 monitors whether or not the relay unit 51 has successfully received the time synchronization information. For example, if the monitoring unit 64 confirms that the switch device 101A has successfully received the Sync message from the master function unit 111A, the monitoring unit 64 notifies the master function unit 111A of successful reception of the Sync message.

On the other hand, it is assumed, for example, that the switch device 101A did not receive a Sync message from the master function unit 111A continuously for at least an amount of time that is K times 125 milliseconds (K is a natural number that is 2 or more), which is the transmission cycle of the Sync message. In this case, the monitoring unit 64 notifies the other in-vehicle devices in the in-vehicle network system 301 of the monitoring result indicating that reception of the Sync message from the master function unit 111A has continuously failed.

More specifically, the monitoring unit 64 notifies all of the other in-vehicle devices, that is, the master function unit 111B, the switch devices 101B and 101C, the end function units 121A, 121B, and 121C, of the above-described monitoring results via the relay unit 51 and the corresponding communication ports 54.

Each in-vehicle device that receives notification of the monitoring results from the switch device 101A determines whether or not to perform GM switching processing based on the content of the monitoring results. For example, when the GM is the master function unit 111A, if notification of the monitoring result with the content described above is received, each in-vehicle device determines that a predetermined condition is satisfied and performs switching processing for switching the GM from the master function unit 111A to the master function unit 111B.

After transmitting the Sync message to the switch device 101A, if the master function unit 111A does not receive a notification of successful reception from the switch device 101A for a predetermined amount of time or longer, the master function unit 111A determines that a predetermined condition is satisfied and performs switching processing for switching the GM from the master function unit 111A to the master function unit 111B.

Also, the switch device 101A monitors the reception status of not only the Sync message from the master function unit 111A, but also the Sync message from the master function unit 111B, that is, the switch device 101A monitors whether or not the Sync message from the master function unit 111B has been successfully received, and notifies the other in-vehicle devices of the monitoring result.

For example, it is assumed that the switch device 101A has continuously not received the Sync message from the master function unit 111B for at least an amount of time that is K times the Sync message transmission cycle. In this case, the monitoring unit 64 of the switch device 101A notifies the other in-vehicle devices in the in-vehicle network system 301 of the monitoring result indicating that failure to receive the Sync message from the master function unit 111B has occurred consecutively.

Then, each in-vehicle device that has received the monitoring results from the switch device 101A determines whether or not to perform GM switching processing based on the content of the monitoring result. For example, even if each in-vehicle device receives the monitoring results with the above-described content when the GM is the master function unit 111A, each in-vehicle device continues time synchronization based on the Sync message from the master function unit 111A without performing GM switching processing.

On the other hand, it is assumed that each in-vehicle device has received notification of the monitoring results with the above-described content in a situation where the GM is the master function unit 111B. In this case, for example, each in-vehicle device determines whether or not to perform GM switching processing by referring to topology information of the in-vehicle network system 301 stored in the storage units 33, 53, and 83. For example, in-vehicle devices that acquire the Sync message from the master function unit 111B via the switch device 101A, that is, the master function unit 111A, the switch device 101A, and the end function unit 121A, determine that a predetermined condition is satisfied and perform switching processing for switching the GM to the master function unit 111A.

Also, the monitoring units 64 of the switch devices 101B and 101C and the monitoring units 42 of the end function units 121A, 121B, and 121C also monitor whether or not the Sync message from the master function units 111A and 111B has been successfully received, similarly to the monitoring unit 64 of the switch device 101A.

Similarly to the monitoring unit 64 of the switch device 101A, the monitoring unit 92 of the master function unit 111A also monitors whether or not the Sync message from the master function unit 111B has been successfully received. Similarly to the monitoring unit 64 of the switch device 101A, the monitoring unit 92 of the master function unit 111B also monitors whether or not the Sync message from the master function unit 111A has been successfully received.

Switching Processing Based on Sequence ID Monitoring Result

The monitoring unit 64 of the switch device 101A may also monitor the identification information attached to the time synchronization information as monitoring of the reception status of the time synchronization information by the relay unit 51.

Specifically, for example, the master function unit 111A transmits a follow-up message including the sequence ID corresponding to the Sync message transmitted immediately before, to the switch device 101A. The monitoring unit 64 of the switch device 101A confirms the ID (hereinafter also referred to as "sequence IDa") included in the message header portion of the frame in which the Sync message is stored, which was received by the information processing unit 62 via the communication port 54A.

Also, the monitoring unit 64 confirms the sequence ID (hereinafter also referred to as "sequence IDb") corresponding to the immediately-previous Sync message indicated by the follow-up message received by the information processing unit 62 via the communication port 54A.

Then, if the sequence IDa and the sequence IDb do not match, the monitoring unit 64 notifies the other in-vehicle devices in the in-vehicle network system 301 of the monitoring result indicating that the sequence IDs of the Sync messages from the master function unit 111A do not match. More specifically, the monitoring unit 64 notifies all of the other in-vehicle devices, that is, the master function units 111A and 111B, the switch devices 101B and 101C, and the end function units 121A, 121B, and 121C, of the monitoring results via the relay unit 51 and the corresponding communication ports 54.

If the GM is the master function unit 111A, each in-vehicle device that has received the above-described monitoring results from the switch device 101A determines that a predetermined condition is satisfied and performs switching processing for switching the GM from the master function unit 111A to the master function unit 111B.

Also, the switch device 101A monitors not only the Sync message from the master function unit 111A but also the ID attached to the Sync message from the master function unit 111B, and notifies the other in-vehicle devices of the monitoring result.

Also, the monitoring units 64 of the switch devices 101B and 101C and the monitoring units 42 of the end function units 121A, 121B, and 121C monitor the IDs attached to the Sync messages from the master function units 111A and 111B, similarly to the monitoring unit 64 of the switch device 101A.

Also, the monitoring unit 92 of the master function unit 111A monitors the ID attached to the Sync message from the master function unit 111B, similarly to the monitoring unit 64 of the switch device 101A. Also, the monitoring unit 92 of the master function unit 111B monitors the ID attached to the Sync message from the master function unit 111A, similarly to the monitoring unit 64 of the switch device 101A.

Flow of Operation

Next, the operation of each in-vehicle device in the in-vehicle network system 301 will be described with reference to the drawings.

The in-vehicle devices in the in-vehicle network system 301 each have a computer that includes a memory, and in each of such devices, an arithmetic processing unit such as a CPU in the computer reads out, from the memory, a program that includes part or all of the steps of the flowchart and sequence described below, and executes the program. The programs executed by the devices can be installed from an external source. The programs executed by the devices are distributed in a state of being stored in recording media or distributed via a communication line.

Operation Procedure Performed when Storing Time Synchronization Information

Figure 9:
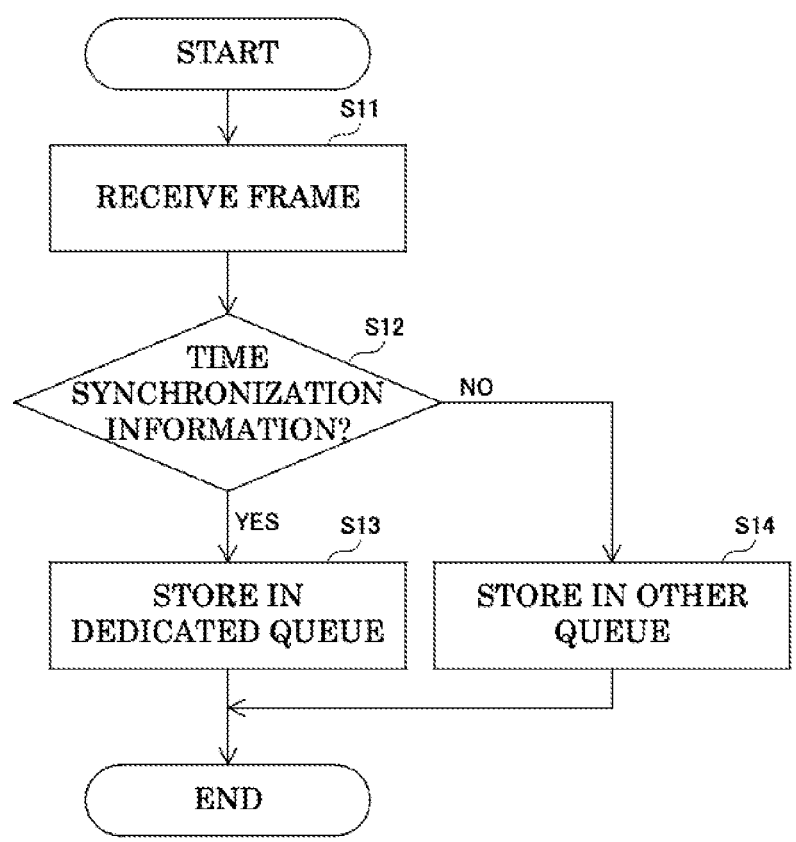
FIG. 9 is a flowchart that defines an operation procedure performed when a switch device in the in-vehicle network system according to the embodiment of the present disclosure stores time synchronization information.

FIG. 9 is a flowchart that defines an operation procedure performed when a switch device in the in-vehicle network system according to the embodiment of the present disclosure stores time synchronization information.

With reference to FIG. 9, first, the information processing unit 62 in the switch device 101A receives frames transmitted from the master function units 111A and 111B via the communication port 54 (step S11).

Next, the information processing unit 62 confirms whether or not the Ethertype value included in the header portion of the received frame is a value corresponding to time synchronization information conforming to the IEEE standard (step S12).

Next, if the Ethertype value is a value corresponding to the time synchronization information ("YES" in step S12), the information processing unit 62 stores the time synchronization information in the dedicated queue 21B of the storage unit 53 (step S13).

On the other hand, if the Ethertype value is a value other than the value corresponding to the time synchronization information ("NO" in step S12), the information processing unit 62 stores the information stored in the received frame in a queue 21 other than the dedicated queue 21B of the storage unit 53 (step S14).

Operation Procedure Performed when Performing Switching Processing Based on Result of Monitoring Reception Status of Sync Message Example 1

Next, as an example of the operation procedure performed when performing switching processing based on the result of monitoring the reception status of the Sync message, an operation procedure performed when the end function unit 121A monitors the reception success of the Sync message will be described with reference to the drawings.

Figure 10:
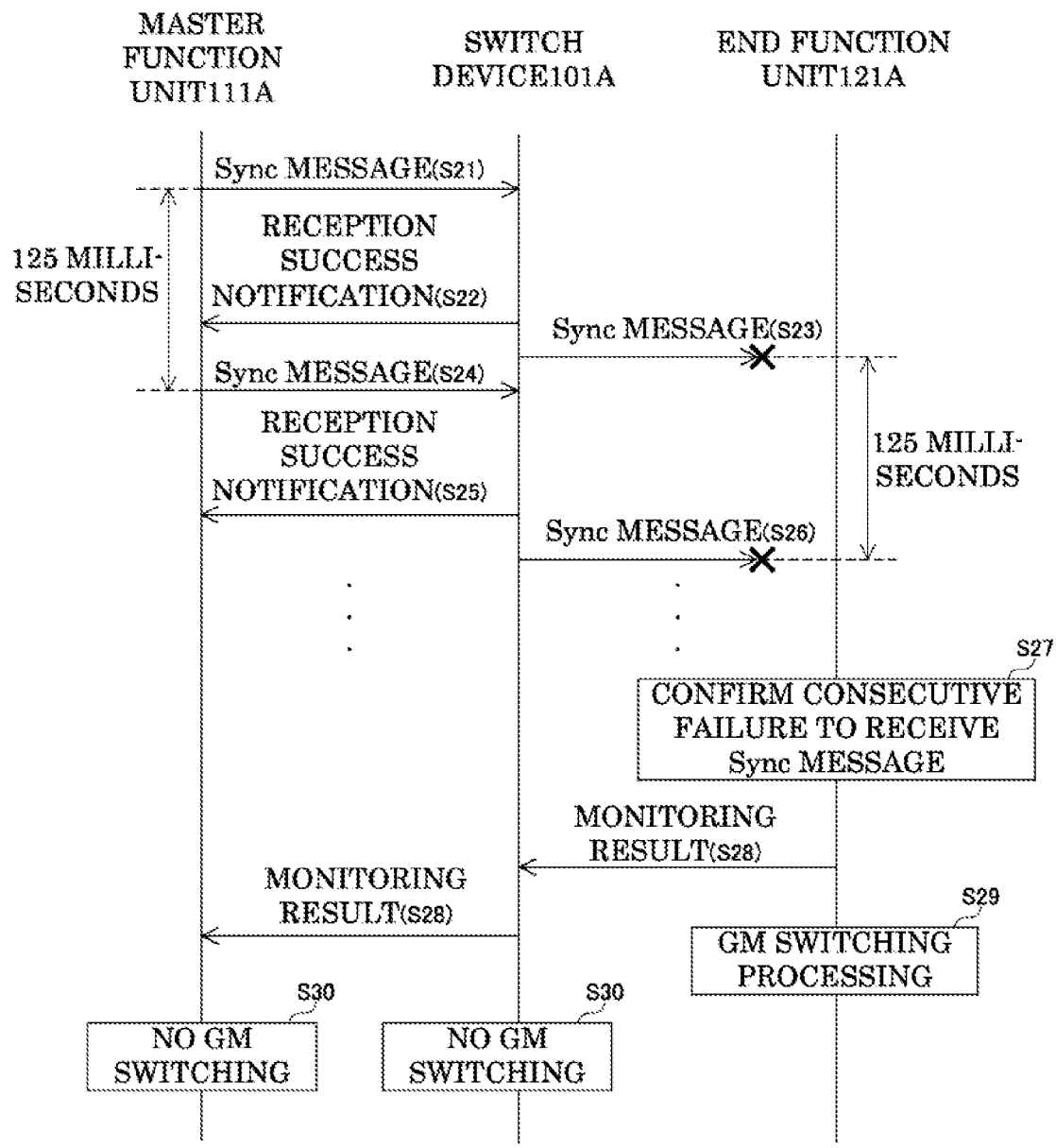
FIG. 10 is a diagram showing a sequence for illustrating an operation procedure for monitoring whether or not a Sync message has been successfully received and switching processing performed based on the monitoring results in the in-vehicle network system according to the embodiment of the present disclosure.

FIG. 10 is a diagram showing a sequence for illustrating an operation procedure for monitoring whether or not a Sync message has been successfully received and switching processing performed based on the monitoring results in the in-vehicle network system according to the embodiment of the present disclosure.

FIG. 10 representatively shows the master function unit 111A, the switch device 101A, and the end function unit 121A among the plurality of in-vehicle devices in in-vehicle network system 301. Here, it is assumed that the master function unit 111A, the switch device 101A, and the end function unit 121A have set the master function unit 111A as the GM.

With reference to FIG. 10, first, the master function unit 111A transmits a Sync message to the switch device 101A (step S21).

Next, upon confirming that the Sync message from the master function unit 111A has been received, the switch device 101A notifies the master function unit 111A of successful reception of the Sync message (step S22).

Next, the switch device 101A transmits the Sync message received from the master function unit 111A to the end function unit 121A. Here, it is assumed that the Sync message transmitted from the switch device 101A does not reach the end function unit 121A due to a factor such as an abnormality occurring on the switch device 101A side or the end function unit 121A side (step S23).

Next, the master function unit 111A transmits a Sync message to the switch device 101A, for example, at a timing 125 milliseconds after the timing at which the Sync message was transmitted in step S21 (step S24).

Next, upon confirming that the Sync message has been received from the master function unit 111A, the switch device 101A notifies the master function unit 111A of successful reception of the Sync message (step S25).

Next, the switch device 101A transmits the Sync message received from the master function unit 111A to the end function unit 121A. Here, it is assumed that the Sync message transmitted from the switch device 101A does not reach the end function unit 121A again (step S26). It is assumed that the operations of steps S24 to S26 are repeated a plurality of times in this manner.

Next, the end function unit 121A monitors the reception status of the Sync message, and confirms that reception of the Sync message for which the master function unit 111A is the transmission source has continuously failed (step S27).

Next, the end function unit 121A notifies the other in-vehicle devices of the in-vehicle network system 301 of the monitoring result indicating that reception of the Sync message from master function unit 111A has continuously failed, directly or via the switch device 101A (step S28).

Next, the end function unit 121A determines that a predetermined condition is satisfied and performs switching processing for switching the GM from the master function unit 111A to the master function unit 111B based on the above monitoring result (step S29).

Also, the master function unit 111A and the switch device 101A refer to, for example, the topology information of the in-vehicle network system 301 stored in storage units 83 and 33, and determine whether or not to perform GM switching processing based on the content of the monitoring result notified from the end function unit 121A. Here, both the master function unit 111A and the switch device 101A can acquire the Sync message from the master function unit 111A without going through the end function unit 121A. For this reason, the master function unit 111A and the switch device 101A continue time synchronization based on the Sync message from the master function unit 111A, for example, without performing GM switching processing (step S30).

Example 2

Next, as an example of the operating procedure for when performing switching processing based on the result of monitoring the reception status of the Sync message, the operating procedure for when the switch device 101A monitors the ID attached to the Sync message will be described with reference to the drawings.

Figure 11:
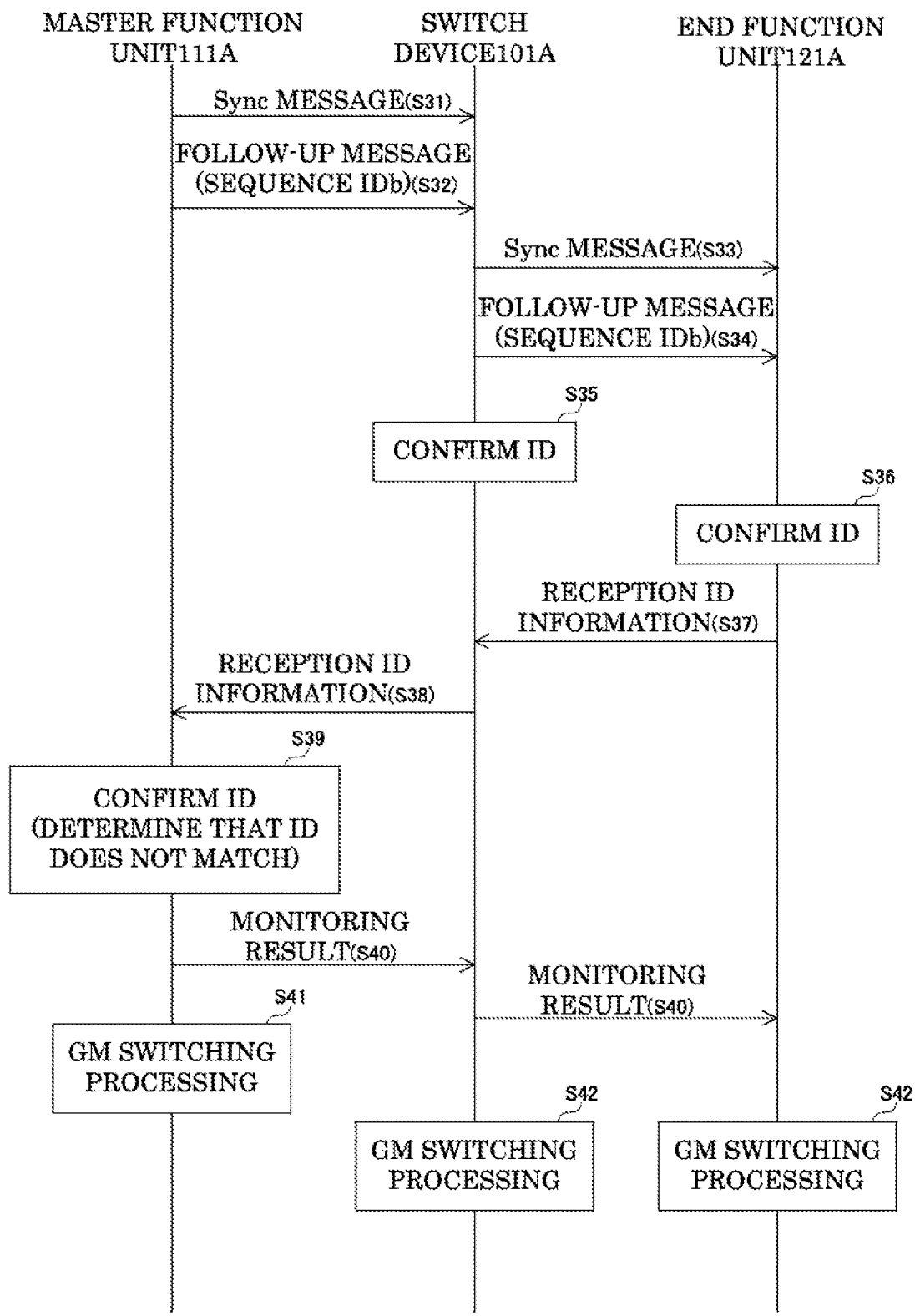
FIG. 11 is a diagram showing a sequence for illustrating an example of an operation procedure of monitoring an ID attached to a Sync message by a switch device and switching processing based on the monitoring result in an in-vehicle network system according to an embodiment of the present disclosure.

FIG. 11 is a diagram showing a sequence for illustrating an example of an operation procedure of monitoring an ID attached to a Sync message by a switch device and switching processing based on the monitoring result in an in-vehicle network system according to an embodiment of the present disclosure.

FIG. 11 representatively shows the master function unit 111A, the switch device 101A, and the end function unit 121A among the plurality of in-vehicle devices in the in-vehicle network system 301. Here, it is assumed that the master function unit 111A, the switch device 101A, and the end function unit 121A have set the master function unit 111A as the GM.

With reference to FIG. 11, first, the master function unit 111A transmits a Sync message to the switch device 101A (step S31).

Next, the master function unit 111A transmits, for example, a follow-up message including the sequence IDb corresponding to the immediately-previously transmitted Sync message to the switch device 101A (step S32).

Next, the switch device 101A transmits the Sync message received in step S31 to the end function unit 121A (step S33).

Next, the switch device 101A transmits a follow-up message including the sequence IDb indicated by the follow-up message received in step S32, for example, to the end function unit 121A (step S34).

Next, the switch device 101A confirms the sequence IDa included in the message header portion of the frame in which the Sync message received in step S31 is stored. Then, the switch device 101A confirms whether or not the sequence IDb indicated by the follow-up message received in step S32 matches the sequence IDa (step S35).

Next, the end function unit 121A confirms the sequence IDa included in the message header portion of the frame in which the Sync message received in step S33 is stored. Then, the end function unit 121A confirms whether or not the sequence IDb indicated by the follow-up message received in step S34 matches the sequence IDa (step S36).

Next, the end function unit 121A transmits reception ID information indicating the sequence IDb indicated by the follow-up message received in step S34, for example, to the switch device 101A (step S37).

Next, the switch device 101A transmits the reception ID information received from the end function unit 121A to the master function unit 111A (step S38).

Next, the master function unit 111A confirms whether or not the sequence IDa included in the message header portion of the frame in which the Sync message transmitted in step S31 is stored matches the sequence IDb indicated by the reception ID information received in step S38 (step S39).

Here, it is assumed that the sequence IDa and the sequence IDb do not match. In this case, the master function unit 111A, either directly or via the switch device 101A, notifies the other in-vehicle devices in the in-vehicle network system 301 of the monitoring result indicating that the sequence ID of the Sync message from the master function unit 111A does not match (step S40).

Next, the master function unit 111A determines that a predetermined condition is satisfied and performs switching processing for switching the GM from the master function unit 111A to the master function unit 111B based on the above-described monitoring result (step S41).

Next, the switch device 101A and the end function unit 121A perform switching processing for switching the GM from the master function unit 111A to the master function unit 111B based on the content of the monitoring result notified from the master function unit 111A (step S42).

By the way, in the time synchronization system described in JP 2020-167616A, if an abnormality occurs on the network, it is possible to once again determine the grand master.

However, if the switching of the grand master, that is, the switching of the device that holds the reference time to be used for time synchronization, is performed frequently, there is a possibility that problems will arise, such as the reference time not being stable, and time synchronization between multiple devices not being performed normally.

In contrast, with the in-vehicle device, the in-vehicle network system, and the information processing method according to the embodiment of the present disclosure, time synchronization can be performed more stably in the in-vehicle network with the configuration and method described above.

The foregoing embodiments are to be construed in all respects as illustrative and not restrictive. The scope of the present disclosure is defined by the claims rather than the description above, and is intended to include all modifications within the meaning and scope of the claims and equivalents thereof.

The above description includes the features appended below.

Supplementary Note 1

An in-vehicle device for receiving time synchronization information transmitted from each of a plurality of reference devices and transmitting the received time synchronization information to another device, including a communication unit configured to communicate with the other device; and an information processing unit configured to, if the communication unit receives a frame in which the time synchronization information is stored, store the time synchronization information in a specific queue with priority over other information, in which the communication unit transmits the time synchronization information stored in the specific queue to the other device, and the information processing unit refers to an Ethertype value included in a message header portion of the received frame, and if the Ethertype value is a value corresponding to the time synchronization information conforming to an IEEE standard, stores the time synchronization information in the specific queue.

The invention claimed is:

1. An in-vehicle device for receiving time synchronization information transmitted from each of a plurality of reference devices holding a reference time and transmitting the received time synchronization information to another device, comprising:
   a communication unit configured to communicate with the other device; and
   an information processing unit configured to, if the communication unit receives a frame in which the time synchronization information is stored, store the time synchronization information in a specific queue with priority over other information,
   wherein the communication unit transmits the time synchronization information stored in the specific queue to the other device, the other device is capable of switching the reference device that is a transmission source of the time synchronization information to be used for time synchronization, to the other of the reference device.

2. The in-vehicle device according to claim 1, wherein the specific queue is a dedicated queue for the time synchronization information conforming to an IEEE standard.

3. The in-vehicle device according to claim 2, wherein the time synchronization information is at least one of a Sync message and a Pdelay Resp used for time synchronization.

4. The in-vehicle device according to claim 2,
   wherein the in-vehicle device further comprises
   a monitoring unit configured to monitor a reception status of the time synchronization information by the communication unit, and
   the monitoring unit notifies the other device of the result of monitoring the reception status.

5. The in-vehicle device according to claim 1, wherein the time synchronization information is at least one of a Sync message and a Pdelay_Resp used for time synchronization.

6. The in-vehicle device according to claim 5,
   wherein the in-vehicle device further comprises
   a monitoring unit configured to monitor a reception status of the time synchronization information by the communication unit, and
   the monitoring unit notifies the other device of the result of monitoring the reception status.

7. The in-vehicle device according to claim 1,
   wherein the in-vehicle device further comprises
   a monitoring unit configured to monitor a reception status of the time synchronization information by the communication unit, and
   the monitoring unit notifies the other device of the result of monitoring the reception status.

8. The in-vehicle device according to claim 7, wherein the monitoring unit monitors whether or not the time synchronization information has been successfully received, or whether or not identification information attached to the received time synchronization information is correct, as the reception status.

9. An in-vehicle network system comprising:
   an in-vehicle device;
   another device; and
   a plurality of reference devices for transmitting time synchronization information, each of the plurality of reference devices holding a reference time,
   wherein if the in-vehicle device receives a frame in which the time synchronization information is stored, the in-vehicle device stores the time synchronization information in a specific queue with priority over other information, and transmits the stored time synchronization information to the other device, and
   the other device receives the time synchronization information transmitted from the in-vehicle device and performs time synchronization based on the received time synchronization information;
   and wherein the reference device that is a transmission source of the time synchronization information to be used for time synchronization, is switched to the another one of the plurality of reference devices by the other device.

10. The in-vehicle network system according to claim 9, wherein each of the in-vehicle device and the other device receives the time synchronization information transmitted from each of the reference devices that are different from each other, and selectively uses the received time synchronization information to perform time synchronization,
    the in-vehicle device monitors a reception status of the time synchronization information and notifies the other device of the result of monitoring the reception status, and
    based on the result of monitoring notified from the in-vehicle device, the other device switches the reference device that is a transmission source of the time synchronization information to be used for time synchronization, to the other of the reference devices.

11. An information processing method for an in-vehicle device for receiving time synchronization information transmitted from each of a plurality of reference devices, each of the plurality of reference devices holding a reference time, and transmitting the received time synchronization information to another device, comprising:
    a step of receiving a frame from the other device;
    a step of storing the time synchronization information in a specific queue with priority over other information if a frame in which the time synchronization information is stored is received; and
    a step of transmitting the time synchronization information stored in the specific queue to the other device, and wherein the reference device that is a transmission source of the time synchronization information to be used for time synchronization, is switched to the another one of the plurality of reference devices by the other device.

* * * * *